(12) United States Patent
Stojanovic

(10) Patent No.: US 8,335,948 B2
(45) Date of Patent: Dec. 18, 2012

(54) TAIL EXTRAPOLATOR AND METHOD

(76) Inventor: Nebojsa Stojanovic, Munich (DE)

( * ) Notice: Subject to any disclaimer, the term of this patent is extended or adjusted under 35 U.S.C. 154(b) by 574 days.

(21) Appl. No.: 12/526,918

(22) PCT Filed: Feb. 12, 2008

(86) PCT No.: PCT/EP2008/051684
§ 371 (c)(1),
(2), (4) Date: Dec. 4, 2009

(87) PCT Pub. No.: WO2008/098934
PCT Pub. Date: Aug. 21, 2008

(65) Prior Publication Data
US 2010/0287423 A1    Nov. 11, 2010

(30) Foreign Application Priority Data
Feb. 12, 2007 (EP) .................................. 07102182

(51) Int. Cl.
*G06F 11/00* (2006.01)
*H03M 13/00* (2006.01)
*H03M 13/03* (2006.01)

(52) U.S. Cl. ........ 714/704; 714/752; 714/786; 714/792; 714/794; 714/821

(58) Field of Classification Search .............. 714/704, 714/752, 786, 792, 794, 821
See application file for complete search history.

(56) References Cited

U.S. PATENT DOCUMENTS

| 3,931,584 | A |   | 1/1976 | Motley et al. |
| 6,044,116 | A | * | 3/2000 | Wang ............................. 375/265 |
| 7,421,638 | B2 | * | 9/2008 | Hewitt et al. ................. 714/755 |

FOREIGN PATENT DOCUMENTS

| EP | 1 473 831 A1 | 11/2004 |
| EP | 1494413 A1 | 1/2005 |
| EP | 1956744 A1 | 8/2008 |
| WO | 0230035 A1 | 4/2002 |
| WO | 2004077737 A1 | 9/2004 |
| WO | WO 2004/098051 A1 | 11/2004 |
| WO | 2005011220 A1 | 2/2005 |
| WO | 2008098934 A1 | 8/2008 |

OTHER PUBLICATIONS

Ciaramella et al., System Performance Using Different Types of In-Line Optical Regenerators, Oct. 2006, IEEE, vol. 24, No. 10, pp. 3727-3733.*

Holzlöhner et al., Accurate Calculation of Eye Diagrams and Bit Error Rates in Optical Transmission Systems Using Linearization, Mar. 2002, IEEE, vol. 20, No. 3, pp. 389-400.*

(Continued)

*Primary Examiner* — John J Tabone, Jr.

(57) ABSTRACT

A method is provided for quantizing an input signal. The number of equal quantized values during a period of time is counted thereby obtaining said number of counts. The counts exceeding a count threshold being defined as reliable counts, the counts lower than or equal to the count threshold being defined as unreliable counts. Two unreliable counts are calculated using a lower and a higher value for a first parameter in an extrapolating function. The first parameter is considered equivalent to the lower value if the two unreliable counts differ less than or equal to a count difference. The invention further discloses a corresponding tail extrapolator.

11 Claims, 7 Drawing Sheets

OTHER PUBLICATIONS

Zhang, Design of LDPC Decoders for Low Error Rate Performance, Nov. 2006, Department of EECS, University of California, Berkeley, CA, pp. 1-25.*

Mizuochi et al. Forward Error Correction Based on Block Turbo Code With 3-Bit Soft Decision for 10-Gb/s Optical Communication Systems, Mar. 2004, IEEE, vol. 10, No. 2, pp. 376-386.*

Srivastava et al., Forward error correcting codes in fiber-optic synchronous code-division multiple access networks, Feb. 15, 2002, Elsevier Science B.V, pp. 287-296.*

Sinkin, Calculation of Bit Error Rates in Optical Fiber Communications Systems in the Presence of Nonlinear Distortion and Noise, 2006, pp. i-v, 1-128.*

Agazzi et al., "Maximum-Likelihood Sequence Estimation in Dispersive Optical Channels", Journal of Lightwave Technology, IEEE Service Center, New York (2005) vol. 23, No. 2, pp. 749-763.

International Search Report, PCT/EP2008/051684, Apr. 25, 2008.

Jaramillo Garcia, et al., "Two Parameter CFAR Detector for Weibull Clutter Based on a Combination of Tail Extrapolation and Importance Sampling Techniques," European Radar Conference, 2004, pp. 253-256.

Jeruchim, Michel C., "Techniques for Estimating the Bit Error Rate in the Simulation of Digital Communication Systems," IEEE Journal on Selected Areas in Communications, vol. Sac-2, No. 1, Jan. 1984, pp. 153-170.

Jeruchim, et al., "Simulation of Communication Systems," 2nd Edition, Kluwer Academic/Plenum Publishers, New York, 2000, pp. 703-710 and 758-759.

Milstein, Laurence B., "Performance Monitoring of Digital Communication Systems Using Extreme-Value Theory," IEEE Transactions on Communications, Sep. 1976, pp. 1032-1036.

Scholz, et al., "A Scheme for High Performance Real-Time BER Measurement," IEEE Transactions on Communications, vol. 40, No. 10, Oct. 1992, pp. 1574-1576.

Scholz, et al., "Error Probability Estimator Structures Based on Analysis of the Receiver Decision Variable," IEEE Transactions on Communications, vol. 43, No. 8, Aug. 1995, pp. 2311-2315.

Smith, et al., "Quick Simulation: A Review of Importance Sampling Techniques in Communications Systems," IEEE Journal on Selected Areas in Communications, vol. 15, No. 4, May 1997, pp. 597-613.

Weinstein, Stephen B., "Theory and Application of Some Classical and Generalized Asymptotic Distributions of Extreme Values," IEEE Transactions on Information Technology, vol. IT-19, No. 2, Mar. 1973, pp. 148-154.

Weinstein, Stephen B., "Estimation of Small Probabilities by Linearization of the Tail of Probability Distribution Function," IEEE Transactions on Communication Technology, vol. COM-19, No. 6, Dec. 1971, pp. 1149-1155.

Examination Report in counterpart European Application No. 08 708 917.3, mailed Jan. 7, 2011.

* cited by examiner

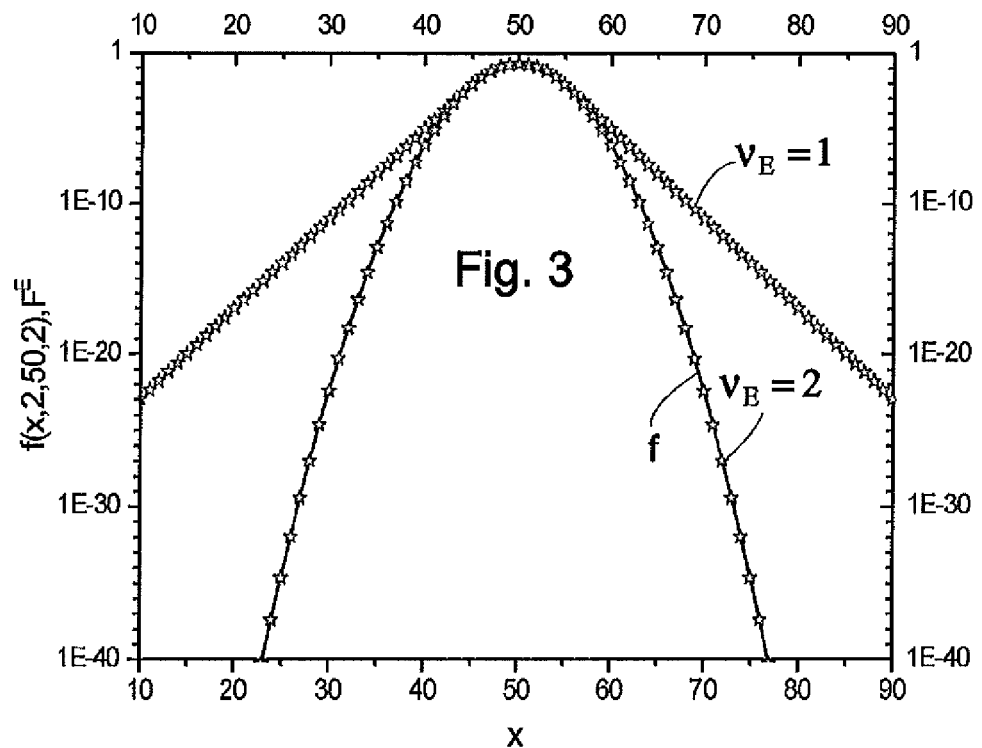
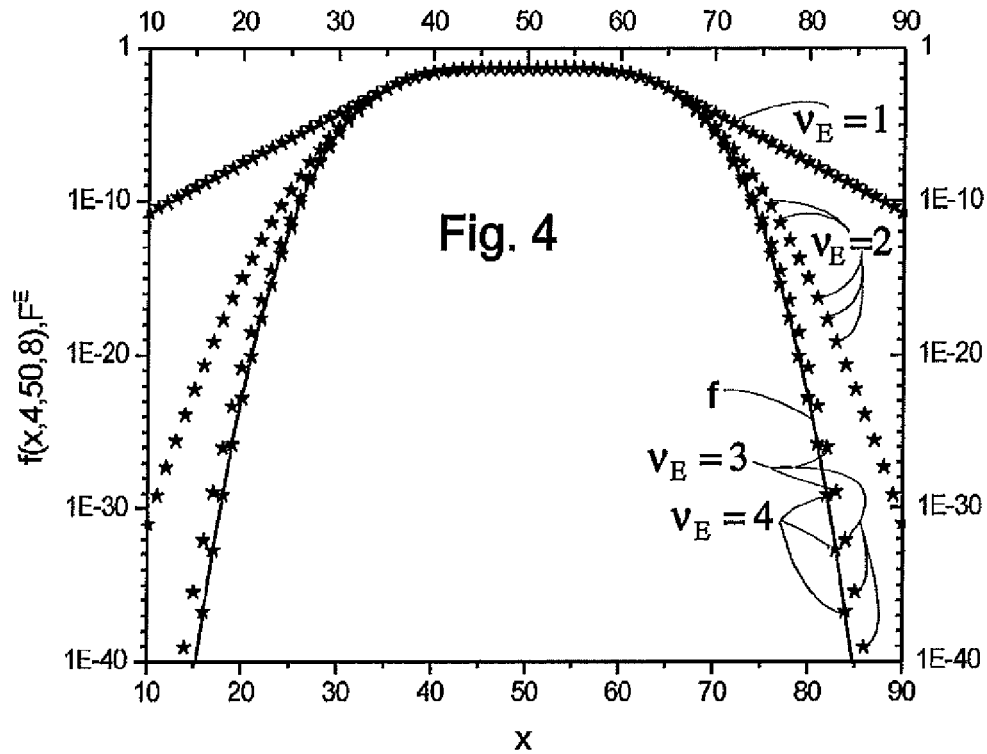

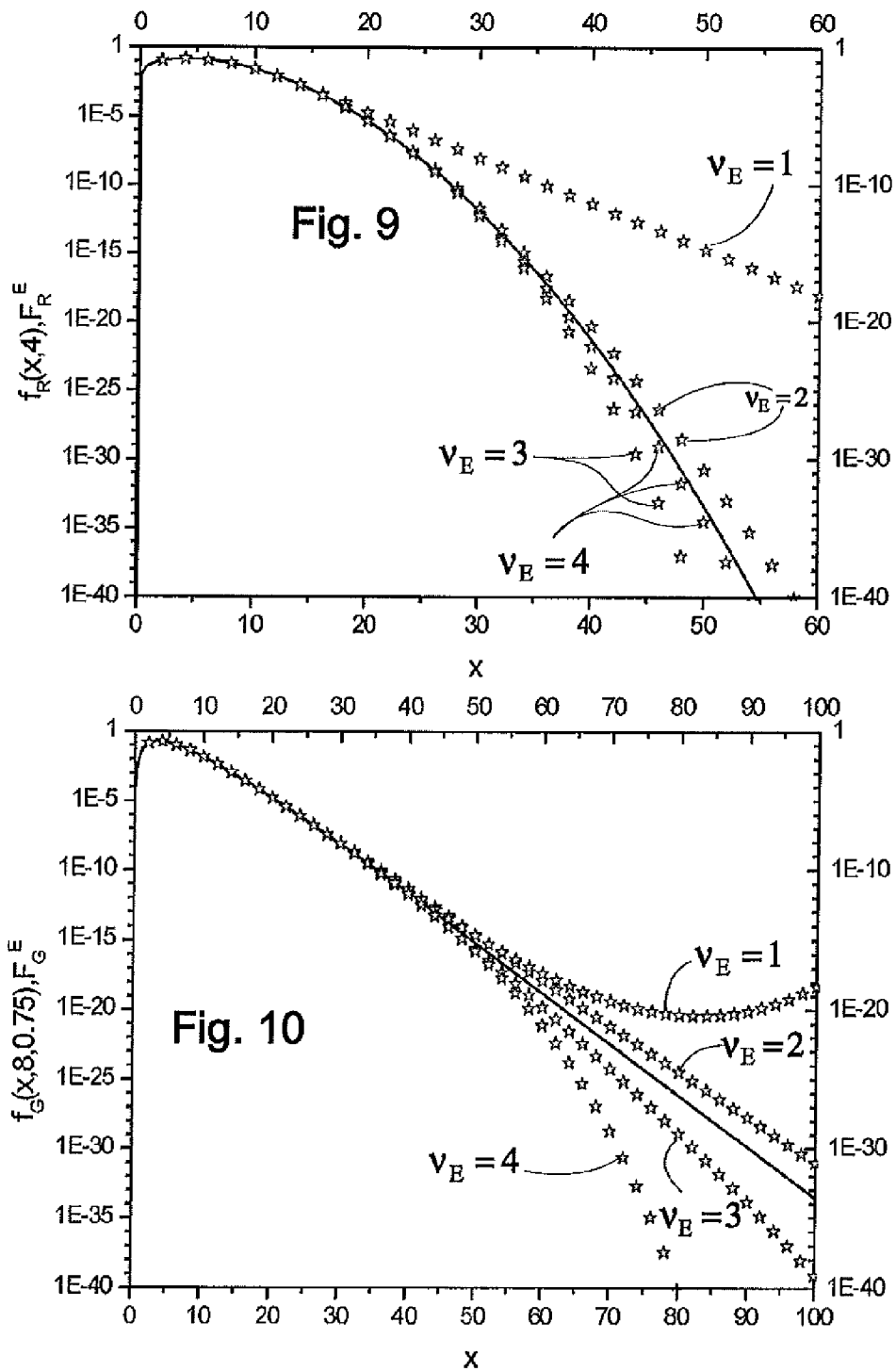

US 8,335,948 B2

TAIL EXTRAPOLATOR AND METHOD

CROSS REFERENCES TO RELATED APPLICATIONS

This application is a U.S. national phase application, pursuant to 35 U.S.C. §371, of PCT/EP2008/051684, filed Feb. 12, 2008, which claims priority to European Patent Application No. 07102182.8, filed Feb. 12, 2007. The entire contents of the aforementioned patent applications are incorporated herein by this reference.

BACKGROUND OF THE INVENTION

The present invention pertains to methods for determining the probability of rare events, in particular for channel and bit error rate (BER) estimation. This invention is in particular helpful for estimating channels suffering from both severe signal distortion causing undesired inter-symbol interference of several symbols and from severe noise. Such conditions prevail for example in metro and long haul high-speed optical fiber communication systems. So the invention may be implemented in particular in optical receivers.

BRIEF SUMMARY OF THE INVENTION

A first approach to channel estimation together with an optical transmission system and a receiver design, in which this invention may be implemented, is described in WO 2005/011220 A1 similar to EP 1 494 413 A1 both titled "Channel Estimation and Sequence Estimation for the Reception of Optical Signal", which are incorporated herein by reference.

This optical transmission system is shown in FIG. 11. It comprises a transmitter 1, an optical channel 4 and a receiver 10. A typical transmitter 1 comprises an forward error correction (FEC) encoder 2 for encoding input data $a_i$ in order to generate encoded data $d_i$ which is forwarded to a modulator 3. The modulator 3 generates an optical signal comprising sent analog data y(t) constituting the output of transmitter 1. The optical signal is transmitted via optical channel 4 to receiver 10.

At the receiver side of the received optical analog data r(t) is input into receiver 10. The receiver 10 comprises a physical interface 11, an automatic gain control (AGC) circuit or variable gain amplifier (VGA) 12, an ADC 13, a clock recovery (CR) subsystem 14, a sampling phase adjustment (SPA) circuit 15, an maximum-likelihood sequence detector (MLSD) 17, a FEC decoder 18, a channel model unit 19 and a receiver control node 20.

The physical interface 11 performs an optical-to-electrical (O/E) conversion. The physical interface is a standard PIN or APD optical front-end with trans-impedance amplification (TIA). The physical interface also acts as an implicit low-pass filter for the received analog data.

The analog serial signal data at the output of a PIN or APD optical front-end is amplified by a high-gain high-dynamic, low-noise AGC circuit 12. The output signal of AGC 12 is designated $\tilde{r}(t)$. The AGC circuit 12 maps the input signal into the input voltage range of the ADC 13 and CR 14. Based on the statistic data provided by channel model unit 19 the receiver control node 20 may obtain peak data (cf. U.S. Pat. No. 3,931,584 titled "AUTOMATIC GAIN CONTROL") or calculate a uniformity parameter, in compliance with WO 20041098061 A1 and EP 1 473 831 A1 both titled "Method for controlling amplification and circuit", for adjusting the gain of AGC/VGA circuit 12, WO 2004/098051 A1 and EP 1473831 A1 are incorporated herein by reference.

The ADC 13 digitizes the analog signal $\tilde{r}(t)$ and outputs quantized data $r_i = r_{i,I}$. Index i refers to symbols and index I to different sampling phases. Index I may assume the values 1 to L for L-fold oversampling. The ADC 13 receives a sampling clock from SPA circuit 15 which in turn receives a sampling clock from clock recovery subsystem 14. The SPA circuit 15 operates as an adjustable delay in order to optimize the phase of the clock which is to say to optimize the sampling times of ADC 13.

The receiver control node 20 in connection with channel model unit 19 may perform a method similar to the disclosure of WO 02/30035 A1 titled "Symbol Timing Recovery Method for Low Resolution Multiple Amplitude Signals". Alternatively receiver control node 20 in connection with channel model unit 19 and SPA circuit 15 may perform one of the methods disclosed in WO 2004/077737 A1, "Self-timing method for adjustment of a sampling phase in an oversampling receiver and circuit", which is also incorporated herein by reference. For this invention it is to be understood that the channel model unit 19 comprises some dedicated or general purpose processor circuitry to perform simple integer calculations and (conceptually) logarithmic calculus as required by the flow chart in FIG. 1. This processor circuitry is illustrated schematically by counters 22, logarithmizers 23 and channel model circuitry 24. In a real implementation a non-linear quantizer, which maps relative frequencies to (quantized) logarithmic values, instead of a logarithmizer can be used. In an implementation according to WO 2005/011220 A1, the sum N of the counter values of counters 22 is not known in advance, since the circuitry within channel model unit 19 is provided for every histogram in WO 2005/011220 A1. Therefore, in the preferred embodiment, the computation of relative frequencies from counter values (i.e. histogram normalization) is done by division, prior to applying the logarithm function by means of the non-linear quantizer.

If, however, the receiver is operated in a range in which one can expect a fairly constant number of hits in each histogram, one may expect that N is the product of data rate multiplied by sampling time of the counters 22 divided by the number of histograms, which is known in advance. The normalizing factor is 1/N and consequently fixed. It could then be allowed for by the thresholds of a non-linear quantizer applied directly to the counter inputs (hence avoiding the division for normalization).

In one embodiment the ADC 13 has a three bit resolution corresponding to eight distinguished quantization levels. In other embodiments the ADC resolution may be different e.g. two, four or eight bits corresponding to four, 16 or 256 quantization levels.

The ADC 13 may comprise one sampler for each sampling phase. Each of the samplers operates at the symbol frequency and may latch its output for further processing by MLSD 17 and channel model unit 19. MLSD 17 may implement a Viterbi algorithm (VA) and outputs the most likely sequence designated detected data $u_i$ to FEC decoder 18. In a typical optical receiver, a powerful FEC code is being used. The bit error rate at the output of MLSD 17 is typically below $10^{-2}$. The subsequent FEC decoder 18 further reduces bit error rate below $10^{-15}$ which is required for data transmission. FEC decoder outputs decoded data $x_i$ for further processing. MLSD 17 and/or FEC 18 may obtain BER estimates and provide same to control node 20.

Control node 20 receives a loss-of-signal (LOS) signal from physical interface 11 and may receive counter values or event frequency information from channel model unit 19 in order to obtain pre-processed statistics data for controlling the AGC/VGA circuit 12, CR 14 and SPA circuit 15.

The estimation of error rate in digital communication systems has received considerable attention over the years. The term extrapolation has been often used in the connection with the estimation of bit error rate (BER) in the region where errors rarely happen. To estimate such events one has to wait for a long time, which might be an unacceptable solution. Based on an assumed error generation model and a few reliable estimations the rest of unknown information can be obtained by some kind of extrapolation. An informal version of extrapolation so called "eyeball" method has long been used. This method extends a BER curve by what appears visually to be reasonable.

A more scientific approach is the tail extrapolation, which assumes that the probability density function (pdf) pertains to a family of special class of distributions. The distribution is estimated first in high probably region of events and based on these estimation the distribution parameters are derived. Usually, the region of signal parameter (amplitude, phase, etc.) is subdivided in certain regions-bins and bin probabilities are thereafter estimated. Then, the bin probabilities can be used for extrapolation in an extrapolative formula, which is derived on the certain distribution, for the estimation of distribution in tail regions.

We will briefly describe Weinstein method (cf. e.g. M. C. Jeruchim, P. Balaban, and K. S. Shanmugan, "*Simulation of Communication Systems*", Kluwer Academic/Plenum Publishers, New York, 2000, later referred to as Jeruchim00) in order to denote differences between this method and the inventive method that will be proposed later on. The generalized exponential (GE) pdf class has a form:

$$f(x; v, \mu, \sigma) = f(x; v) = \frac{v}{2\sqrt{2}\,\sigma\Gamma(1/v)} \exp\left\{-\left|\frac{x-\mu}{\sqrt{2}\,\sigma}\right|^v\right\}, \quad (1)$$

$$-\infty < x < \infty$$

where $\Gamma$ is the gamma function. The mean of the distribution is $\mu$ and the variance $\sigma_v$ is:

$$\sigma_v = 2\sigma^2 \Gamma\left(\frac{3}{v}\right) \Gamma\left(\frac{1}{v}\right) \quad (2)$$

For v=2, the distribution becomes normal (Gaussian).

The probability p(t) of exceeding some value t+μ>0 is equal to:

$$p(t) = \int_{t+\mu}^{\infty} f(x; v) dx. \quad (3)$$

By some assumptions and expansions the final extrapolative equation is obtained:

$$\ln[-\ln p(t)] \approx v \ln\left(\frac{t}{\sqrt{2}\,\sigma}\right) \quad (4)$$

This equation is transformed into a linear equation:

$$y = \alpha + \beta x \quad (5)$$

where y=ln(−ln p(t) and x=ln(t). The best straight-line fit of three points is made and the line is extended to the actual threshold. This method suffers of many problems as, for instance, bias in extrapolation estimate, high variance of estimator, etc.

In many applications, noise is supposed to be Gaussian and the noise model is often used for soft-input data recovery circuits as, for example, convolutional codes, turbo codes, equalization, etc. Especially in nonlinear systems pdfs have specific shapes that depend on channel memory, signal strength, receiver design etc. In robust digital receivers is customary to estimate channel conditions and thereafter use the channel model for data recovery. Also, the pdfs can be used for BER performance estimation of the receiver.

The best approach (cf. O. E. Agazzi, M. R. Hueda, H. S. Carrer, and D. E. Crivelli, "Maximum-Likelihood Sequence Estimation in Dispersive Optical Channels", *Journal of Lightwave Technology*, Vol. 23, No. 2, pp. 749-763, 2005) is to estimate noise distribution parameters when noise distribution is known in advance or complete pdf. The estimation method is normally based on a quantized signal whose amplitudes can take one of a few discrete values. Let the analog-to-digital converter output $n_{ADC}$-bit string for each sampled value of analog received signal. These quantized values can be counted and represented by histograms. Depending on channel memory and transmitted bits there will be more than one histogram describing the current channel. At least two histograms are needed for binary signaling. The main difficulty with the histogram method is that a large number of samples is needed to obtain accurate estimates. This is particularly problematic and tail regions of the pdf where it may take an excessive amount of time to obtain enough samples.

For time-variant channels it is desirable to have the channel model as fast as possible. This constrains histogram collecting time, and consequently not all histogram bins, in particular in the tail regions, are occupied. The empty bins have to be extrapolated and thereafter used for data recovery. Without extrapolation many problems can arrive and decline the receiver performance. One of the biggest problems is an error floor that can constrain the application area of the receiver.

It is the object of this invention to provide a method and a tail extrapolator for improved tail extrapolation.

This object is achieved by the subject matter of the independent claims.

Embodiments of the invention are the subject matters of the dependent claims.

Since the order of a tail extrapolation is determined in an iterative manner, only a part of the pdf is used for the extrapolation. The used part advantageously is a good trade-off between reliability and smallness so that the used part and the tail can be described by a single class of functions.

All adjustable values, in particular the count threshold and the upper limit for the order or the first parameter, serve to adjust this trade-off to the specific class of channels under consideration.

Increasing the count difference ensures convergence in a reasonable range in a surprisingly simple manner.

Using quantized logarithm of the counts rather than logarithm of the counts itself simplifies the required calculation resources from floating point to integer and restricts integer calculations to the minimum number of bits required. This is particularly important for high-speed applications.

BRIEF DESCRIPTION OF THE DRAWINGS

In the following preferred embodiments of this invention are described referring to the accompanying drawings. In the drawings:

FIG. 3 shows a probability extrapolation of f(x; 2, 50, 2) for $\square$=1;

FIG. 4 shows a probability extrapolation of f(x; 4, 50, 8) for $\square$=1;

FIG. 9 shows a probability extrapolation of a Rayleigh distribution $f_R$(x; 4) for $\square$=1;

FIG. 10 shows a probability extrapolation for a Gamma distribution $f_G$(x; 8, 0.75) for $\square$=1.

ABBREVIATIONS

Figure 1:
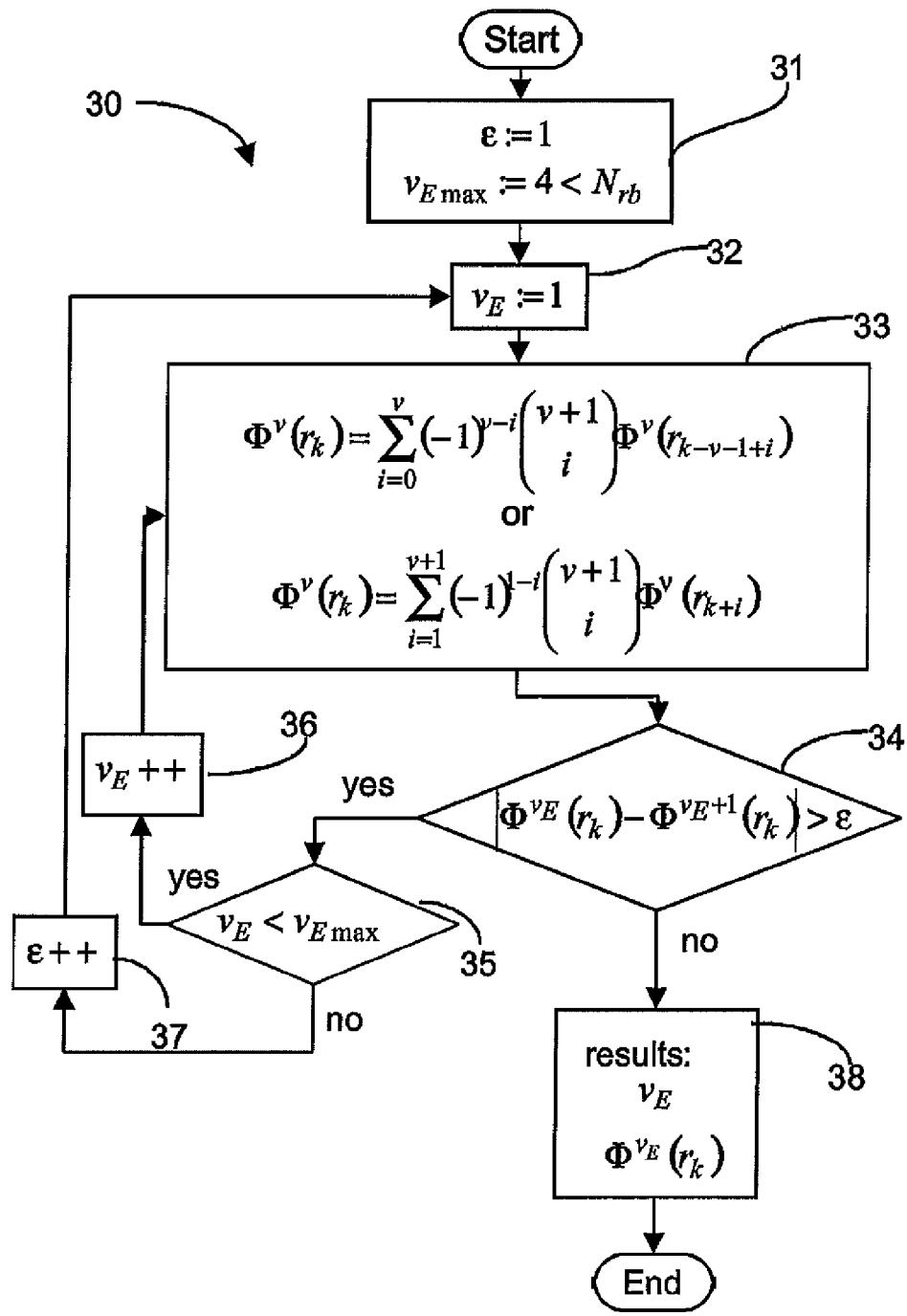
FIG. 1 is a flow chart of the inventive tail extrapolation method.

APD Avalanche Photo Diode
ADC Analog-to-digital converter
AGC Automatic gain control
BER Bit error rate
CR Clock recovery
DEQ Digital equalizer
ECC Error correcting code
FEC Forward error correction
GE Generalized exponential
ISI Intersymbol interference
LOS Loss-of-signal
MLSD Maximum-Likelihood Sequence Detector
O/E Optical-to-electrical
pdf Probability density function
SPA Sampling phase adjustment
TIA Trans-impedance amplification
VGA Variable gain amplifier

Mathematical Symbols $B=2^{n_{ADC}}/N_b$; bin width in terms of $\Delta$
$\Delta$ ADC quantization step
$\epsilon$ extrapolation parameter
$F(r_k)$ probability for bin k
$F_{min}$ minimum frequency
$F_C \approx$ BER
$F_L(r_k)$ log $F(r_k)$
$F_L^Q(r_k)$ quantized $F_L(r_k)$
$f_G(x;v,\sigma)$ gamma or chi-squared distribution
$f_L(x,v)$ log f(x;v)
$f_R(x,\sigma)$ Rayleigh distribution
$n_{ADC}$ ADC resolution, number of bits
N total number of counts
$N_b$ number of bins
$n_p$ number of bits representing branch metrics
$N_{rb}$ number of reliable bins
v order
$v_E$ order of extrapolation
$v_{E\,max}$ maximum order of extrapolation
$\Phi(r_k)$ $F_L(r_k)$, $F_L^Q(r_k)$
$r_k$ central value between $s_{k-1}$ and $s_k$
$s_k$ ADC thresholds
$T_R$ reliability threshold While the present invention is described with reference to the embodiments as illustrated in the following detailed description as well as in the drawings, it should be understood that the following detailed description as well as the drawings are not intended to limit the present invention to the particular illustrative embodiments disclosed, but rather the described illustrative embodiments merely exemplify the various aspects of the present invention, the scope of which is defined by the appended claims.

General

The basic idea of this invention is to choose an extrapolation function for the tail regions of a probability density function which comprises a parameter that is called order. The order is determined in an iterative manner. More specifically, the probability density function is estimated by histograms that are represented by the content of bins. The bins are utilized in the extrapolation by applying the set of extrapolative equations, which are derived on generalized exponential class of pdfs. The iteration is stopped when the difference between two extrapolated values in two successive iterations is less than some predetermined threshold.

Typically, as described in e.g. WO 2006/011220 A1, the bin values are not directly used in data recovery circuits. For example, the decoders based on trellis approach, which search for the best path in the trellis, use quantized logarithm of relative frequencies to represent branch metrics. So, path metric calculation is simplified and uses simple addition instead of multiplication. Usually, designers first define the minimum frequency to be quantized $F_{min}$ and number of bits, $n_p$, representing branch metrics. A typical value for $F_{min}$ is $10^{-15}$ and a typical value for $n_p$ is greater than or equal to 4. The space between log $F_{min}$ and 0 (log 1=0) is divided into $2^{n_p}-1$ uniform intervals and each bin probability is represented by one of $2^{n_p}$ values. It is customary that the highest probability gets the quantized value of 0 ($0 \geq \log F > \log F_{min}/(2^{n_p}-1)$) and that the value of $2^{n_p}-1$ is assigned to the minimum frequency (log $F_{min} \geq$ log F>$-\infty$). F may be a normalized frequency.

Figure 2:
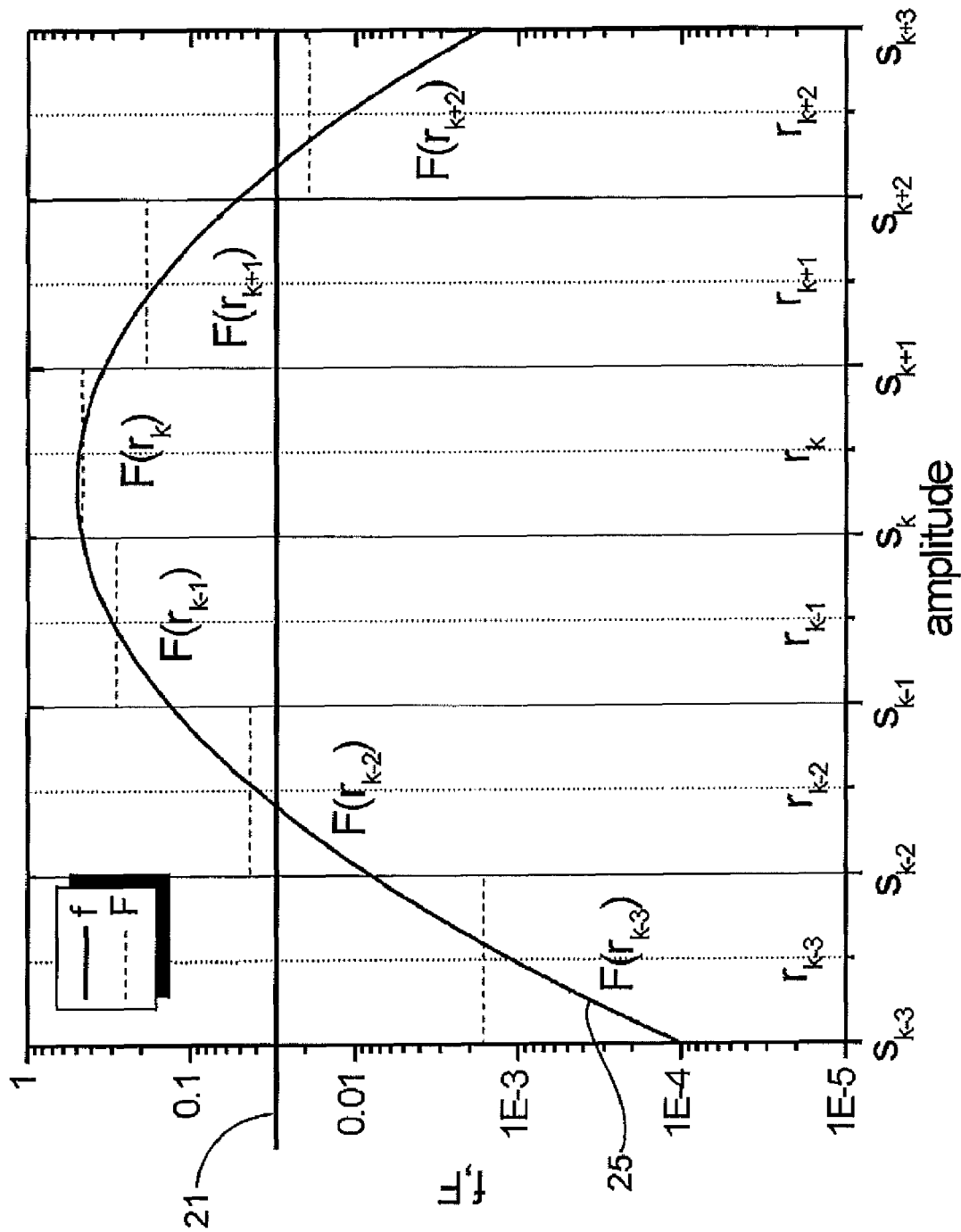
FIG. 2 shows a probability density function $f$ and resulting bin probabilities F.

Let us consider the pdf 25 shown in FIG. 2. We assume that the current pdf pertains to the class of pdfs described by (1). The ADC thresholds are uniform and set to values $s_k$, k=1, . . . , $2^{n_{ADC}}-1$. In FIG. 2, the distance between two adjacent thresholds is equal to an ADC quantization step $\Delta$, which means that the bin width B in terms of ADC quantization steps is equivalent to 1. The central value between two successive thresholds $s_{k-1}$ and $s_k$ is denoted by $r_{k-1}$. The frequency values F in FIG. 2 are normalized to 1 so that:

$$\sum_{i=0}^{N_b} F(r_i) = 1 \qquad (6)$$

Due to the normalization, the frequency values F may be considered as estimates for probabilities and will also be referred to as probability estimates or empirical probabilities in the following. $N_b$ is the number of bins, which is $2^{n_{ADC}}$ in the example of FIG. 2.

The frequency values $F(r_i)$ in FIG. 2 have been chosen to comply with equation (10). This result can only be expected, if the sampling time tends to infinity. Strictly speaking, equation (10) applies only for this border case. In reality, one may expect bigger deviations from equation (10) for shorter sampling times.

A reliability threshold $T_R 21$ is shown at a probability of 0.03. All empirical probabilities greater than the reliability threshold are considered to be reliable probability estimates, all empirical probabilities lower than the reliability threshold are extrapolated as will be described below in connection with FIG. 1. In FIG. 2, the reliability threshold has been set to 0.03 for illustrating left- and right-hand-side extrapolation. In a real implementation the reliability threshold is set e.g. to $10^{-3}$. The reliability threshold may be set to slightly different values, e.g. depending on the histogram measurement time and histogram shape.

By applying logarithm on (1) we obtain $$\log f(x; v) = f_L(x, v) = \log \frac{v}{2\sqrt{2}\,\sigma\Gamma(1/v)} - \left|\frac{x-\mu}{\sqrt{2}\,\sigma}\right|^v \log e. \quad (7)$$

Obviously, the $(v+1)$-th derivative of the log probability is equal to 0. By mathematical induction, for any value of v (v is an integer) one can easily prove $$\sum_{i=0}^{v+1} (-1)^{v+1-i} \binom{v+1}{i} \Phi(r_{k-v+1+i}) = 0 \quad (8)$$

$$\Phi(r_k) = f_L(r_k, v), \quad r_{k+1} = r_k + \Delta \quad (9)$$

$$\binom{v+1}{i}$$

are binomial coefficients. In general $r_k$ is an equidistant sequence of x-values in equation (7), which designate the amplitude of the signal. The variables, however, have been chosen that they conform to FIG. 2 to which we now revert. The channel estimator uses counters, e.g. counters 22, that count all events between certain two ADC thresholds, which are not necessarily next neighbors. The distance between the certain two ADC thresholds is equal to an integer number B times ADC quantization step $\Delta$ and may be regarded as a bin. Really, instead of the probability density $f(r_k)$ a bin represents $$F(r_k) = \int_{s_k}^{s_{k+1}} f(x)dx \quad (10)$$

We suppose that ADC quantization is fine enough and that pdf between two adjacent thresholds is approximately linear. This allows us to assume that $$F(r_k) \approx f(r_k) \cdot \Delta, \Delta = s_{k+1} - s_k \quad (11)$$

and we define:

$$F_L(r_k) = \log F(r_k) \quad (12)$$

The quantization of log probability is usually done by $$F_L^Q(r_k) = \left\lfloor \frac{F_L(r_k)(2^{n_p} - 1)}{\log p_{min}} \right\rfloor \quad (13)$$

wherein $\lfloor \ \rfloor$ is the floor function, which returns the largest integer value less than or equal to the argument. In view of equations (11) to (13) we can either use:

$$\Phi(r_k) = F_L(r_k) \quad (14)$$

or $$\Phi(r_k) = F_L^Q(r_k) \quad (15)$$

where "$\approx$", resulting from equation (11) is replaced by "=" in equations (14) and (15), which allows us to use the last equations for the extrapolation.

The equation (8) combined with either equation (14) or (15) can be used for the extrapolation of pdf in bins placed in the tail regions. The parameter v is usually unknown and is consequently estimated. The estimation of this parameter is indirectly done in the extrapolation procedure explained below.

Method Description

The extrapolation of bin k can be accomplished in a few steps by an extrapolation method 30 as illustrated in FIG. 1.

1) Define the extrapolation parameter $\epsilon > 0$ (depending on $\Phi$) and maximum value of the order of extrapolation $v_E$, $V_{Emax}$ in step 31. The number of reliable bins $N_{rb}$ used at the beginning of extrapolation procedure must be greater than $v_{Emax}$. Due to the quantization of $\Phi(r_k) = F_L^Q(r_k)$, the extrapolation parameters $\epsilon$ may be set to 1 at this stage.
2) Set the order of extrapolation $v_E$ to 1 in step 32
3) By (8) and (14) or (15), in step 33, calculate extrapolation values $\Phi^{v_E}(r_k)$ and $\Phi^{v_E+1}(r_k)$ as $$\Phi^v(r_k) = \sum_{i=0}^{v} (-1)^{v-i} \binom{v+1}{i} \Phi^v(r_{k-v-1+i}), \quad v = v_E, v_E + 1 \quad (16)$$

This formula is used for the extrapolation of bins that are on right hand side of the reliable bins. Similarly, the extrapolation of bins placed on the left hand side of the reliable bins is done by $$\Phi^v(r_k) = \sum_{i=1}^{v+1} (-1)^{1-i} \binom{v+1}{i} \Phi^v(r_{k+i}), \quad v = v_E, v_E + 1 \quad (17)$$

For all reliable bins holds $\Phi^v = \Phi$ and they are not additionally extrapolated.

4) If $|\Phi^{v_E}(r_k) - \Phi^{v_E+1}(r_k)| > \epsilon$, what is checked in step 34, and $v_E < v_{Emax}$, what is checked in step 35, increase $v_E$ by 1 in step 36 and go to item 3, the step 33
5) If $|\Phi^{v_E}(r_k) - \Phi^{v_E+1}(r_k)| > \epsilon$ and $v_E = v_{Emax}$, increase $\epsilon$ in step 37 and go to item 2, step 32
6) If $|\Phi^{v_E}(r_k) - \Phi^{v_E+1}(r_k)| \leq \epsilon$ the extrapolation of bin k is finished. The order of extrapolation is equal to $v_E$ and the extrapolated value is $\Phi^{v_E}(r_k)$.

Provided that the transmission channel can actually be described by a generalized exponential of an integer order, one may assume that obtaining $V_E$ and extrapolated bin values $\Phi^{v_E}(r_k)$ from a fit may be the better solution, since all information is used and no information is discarded. However, it is well known (e.g. Jeruchim00) that the pdf does not have the form of a generalized exponential over its entire range. In this context we also refer to the extrapolation of Rayleigh and Gamma distributions shown in FIGS. 9 and 10. Consequently, it appears reasonable to use the next available reliable bins for extrapolation and apply the extrapolation method 30 to the left and right hand sides of the reliable bins separately. So the left hand side may be extrapolated using an order-1 GE and the right hand side may be extrapolated using an order-2 GE.

Further, the extrapolation method 30 just extrapolates a single additional bin. However, after applying method 30 the first time, the order $v_E$ is known and the extrapolated and reliable bins may be used to extrapolate further unreliable bins, which do not directly neighbor to reliable bins.

Be aware that for quantized log probability the extrapolated value cannot be greater than $2^{n_P}-1$. That is, in this case the final extrapolated value is $\min(2^{n_P}-1, \Phi^{v_E})$ that can be thereafter used in data recovery procedure.

Demonstration of Method

To illustrate the effectiveness of the described method we apply new extrapolation on pdfs f(x; 2, 50, 2) and f(x; 4, 50, 8) of GE class for bin size of 1 ($\Delta$). All bins whose probabilities were less than $10^{-3}$ are extrapolated. Results are presented in FIGS. 3 and 4. The graphs of the functions are marked with a line. The extrapolated values are marked with stars.

In FIG. 3 the first order $v_E=1$ extrapolation is only acceptable down to a range of $10^{-4}$ to $10^{-5}$. The second order extrapolation $v_E=2$ follows the function perfectly.

In FIG. 4, the graphs marked by stars follow the function the better the closer the order comes to the real value of 4. Increasing the order of extrapolation ($v_E$) beyond the true value of v provides the same extrapolation results as $v_E=v$.

Enlarging bin size resulting in a smaller number of reliable bins does not decline the accuracy of extrapolation. Just a few reliable bins are needed for the correct extrapolation.

Figure 5:
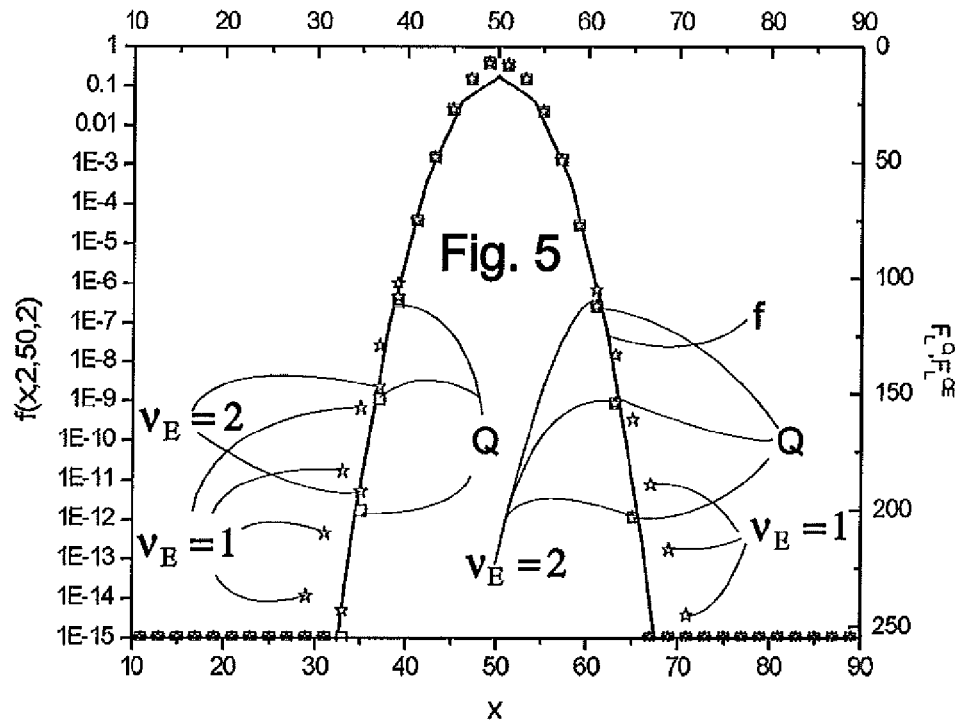
FIG. 5 shows a quantized probability extrapolation of f(x; 2, 50, 2) for $\square$=2.
Figure 6:
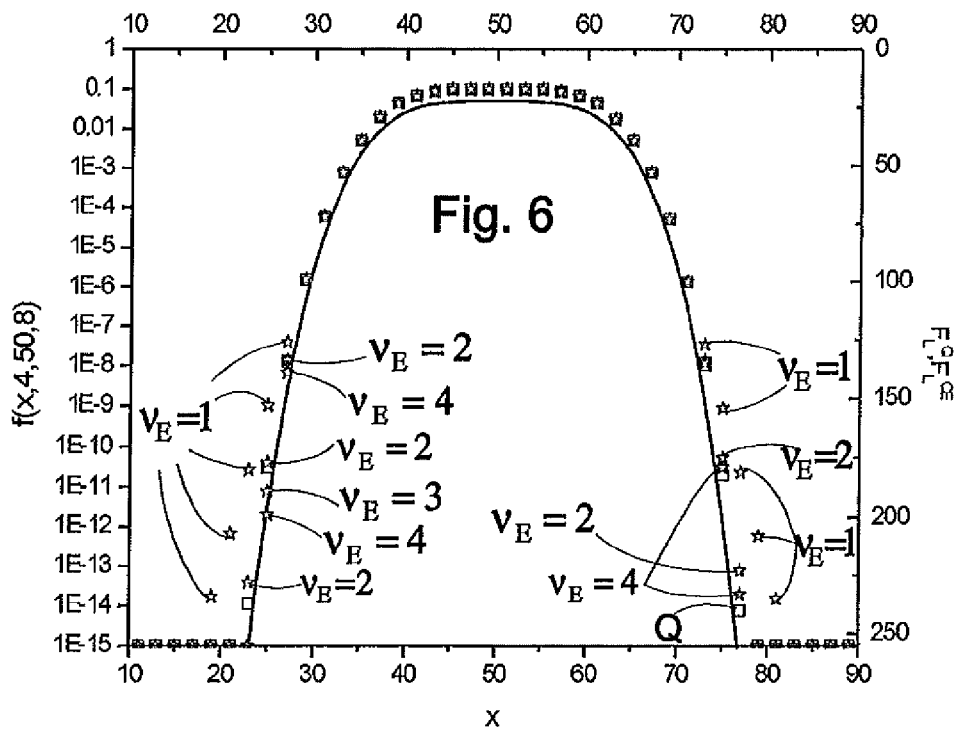
FIG. 6 shows a quantized probability extrapolation of f(x; 4, 50, 8) for $\square$=2.

The extrapolation of quantized log probabilities is important in practical systems using some kind of channel estimator to decode the received signal. We have simulated quantizer with parameters $n_p=8$ and $p_{min}=10^{-15}$. All bins whose probabilities were less than $10^{-6}$ are extrapolated. Results are presented in FIGS. 5 and 6. The quantized values are marked with squares, the extrapolated values with stars. The next implementation will use the value $n_p=6$ which seems to be a good tradeoff with other requirements such as power dissipation. $n_p=8$ is still within current technology but provides superior extrapolation accuracy. Higher $n_p$ values will further improve accuracy at the price of higher power consumption and complexity.

The extrapolation of quantized log probabilities is not that accurate as the one applied on real log probabilities. However, these extrapolated values are acceptable in real systems and provide excellent decoder performance.

Designers of receivers using soft-input data recovery (quantized signal is used) normally know a lot of channel model. By careful selection of parameters $n_p$, $p_{min}$, $\Delta$, $v_{Emax}$ and $\epsilon$ performance of system using the extrapolated channel model can be close to the optimum for any noise scenario, usually described by pdf.

Figure 7:
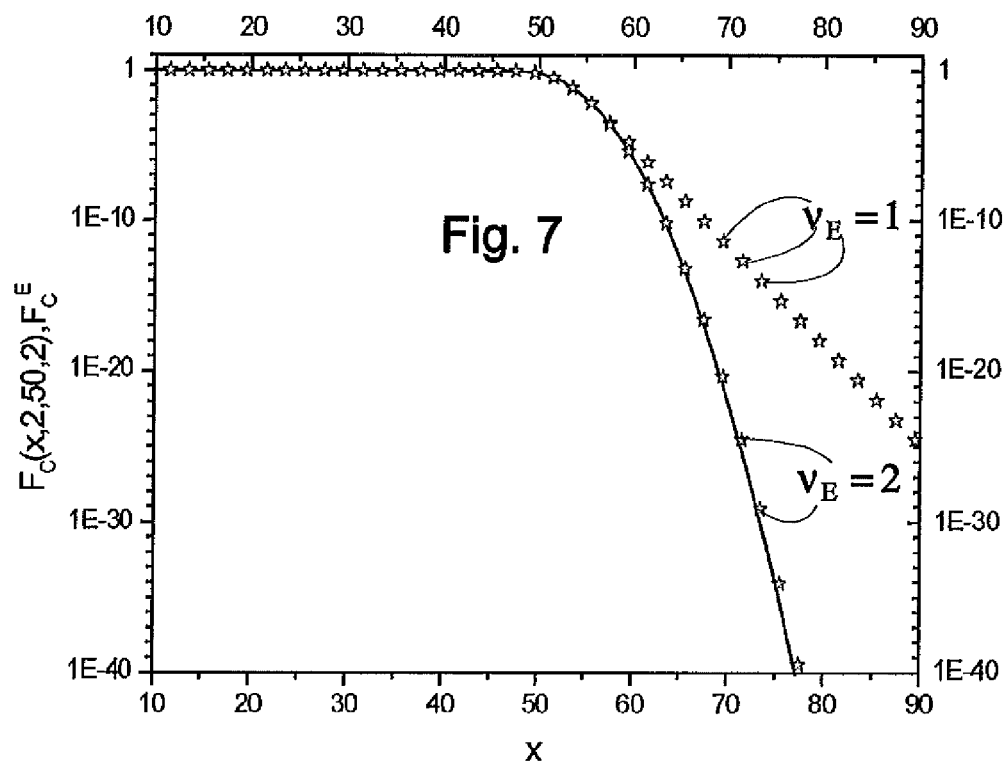
FIG. 7 shows a BER extrapolation of $F_C$(x; 2, 50, 2) for $\square$=1.
Figure 8:
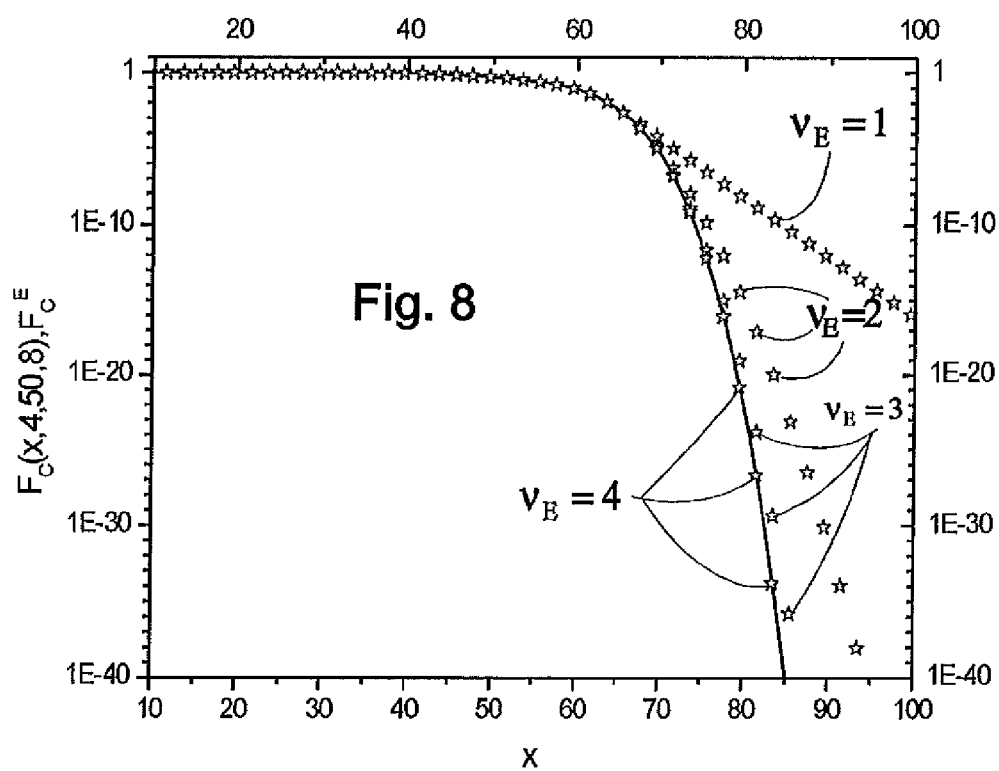
FIG. 8 shows a BER extrapolation of $F_C$(x; 4, 50, 8) for $\square$=1.
Figure 11:
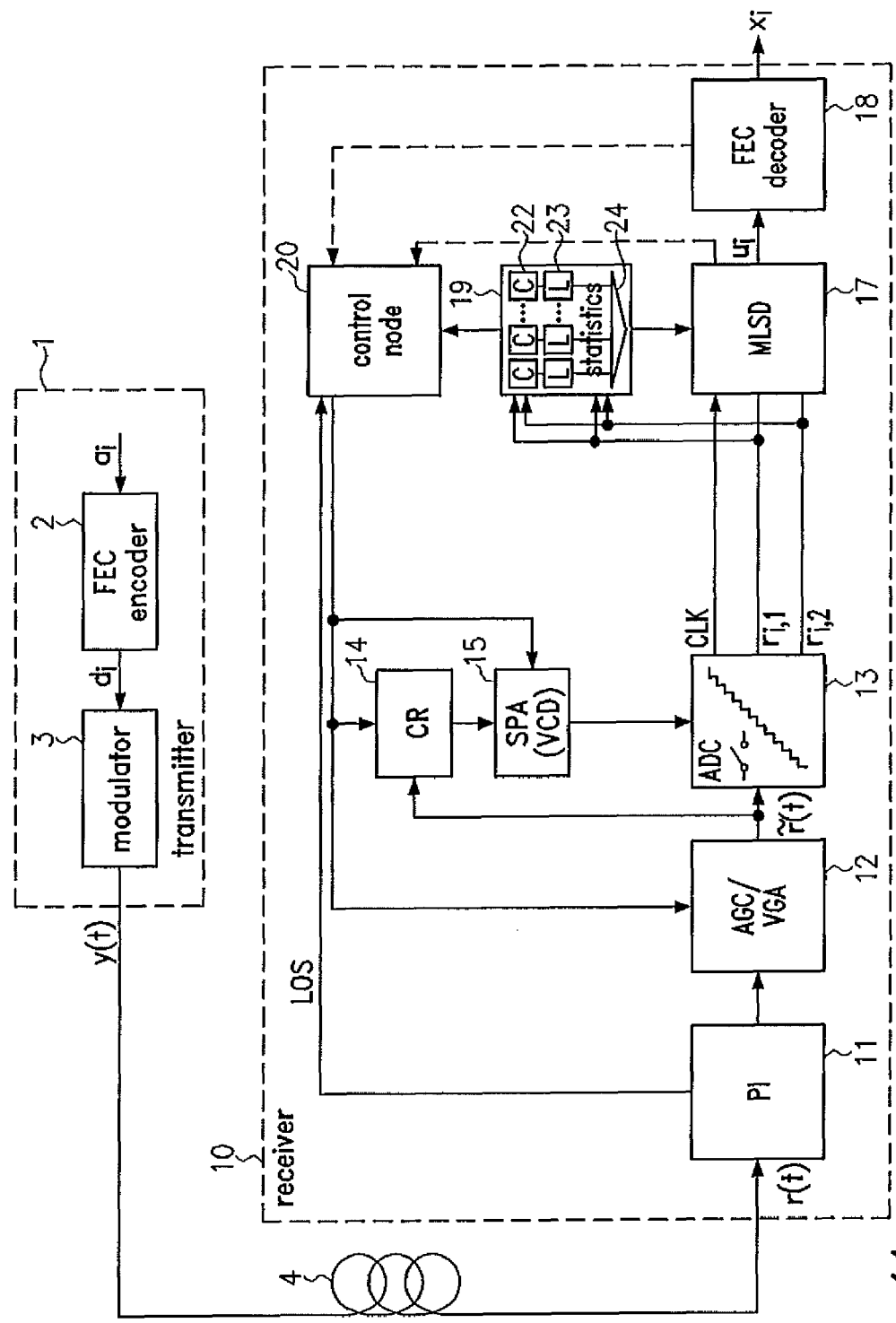
FIG. 11 shows a block diagram of an optical fiber communication system

Now we would like to turn to the extrapolation of BER of GE pdf. Let us define $F_C$ by $$F_C(r_k) = 1 - \int_{-\infty}^{s_k} f(x)dx = \int_{s_k}^{\infty} f(x)dx = \sum_{i=k}^{\infty} F(r_i) \quad (18)$$

where $$\int_{-\infty}^{s_k} f(x)dx$$

is the cumulative distribution function, which is closely related to BER, and can be used for BER estimation. Instead of F we have used $F_C$ in the extrapolative formula (8). The results are presented in FIGS. 7 and 8.

The robustness of the extrapolative method applied in BER extrapolation is impressive. The user has to carefully define the parameter $\Delta$. Apparently, the parameter must not be too big in a waterfall region of BER curve.

Finally, we have applied the extrapolation to Rayleigh and gamma (or chi-squared) distributions defined by $$f_R(x, \sigma) = \frac{x}{\sigma^2} \exp\left(-\frac{x^2}{2\sigma^2}\right), x \geq 0 \quad (19)$$

$$f_G(x; v, \sigma) = \frac{x^{v/2-1}}{2^{v/2}\sigma^v \Gamma(v/2)} \exp\left(-\frac{x}{2\sigma^2}\right), x \geq 0, \quad (20)$$

respectively.

Results of Rayleigh distribution are presented in FIG. 9. All bins whose probabilities are less than $10^{-3}$ were extrapolated. For gamma distribution the extrapolation was applied to bins having probability less than $10^{-6}$. Gamma distribution extrapolation is shown in FIG. 10.

Visible is that the extrapolation values are quite reliable for the interesting range of BER's greater than $10^{-15}$. Below this BER the extrapolation values diverge and it is not clear what value should be selected as the best. This is more emphasized for the case of gamma distribution. A solution could be to fix the order $v_E$ to 3 in the case of a Rayleigh distribution and to 2 in the case of a gamma distribution. Alternatively, the maximum order $v_{Emax}$ could be set to 3 and 2, respectively. A third alternative is to use weighted geometric averages:

$$F_G^E = \sqrt[3]{(\Phi^{v_E=2})^2 \cdot (\Phi^{v_E=3})} \quad (21)$$

In equation (21), the bins calculated with an order 2 extrapolation are weighted with an exponent 2 and the order 3 values are weighted with an exponent of 1. The sum of the exponents gives the number of the root, 3 in this case. In general, weighted averages are a way to define non-integer, real orders of extrapolation.

On the other hand, in most applications designers are interested in the area of BER's greater than $10^{-15}$. If it is so, the suggested extrapolator can be applied to the other distributions as well. Further, in the examples above, we obtained the bin counts based on calculated pdfs. This means that the bin counts are exact. In a real application, the bin counts are subject to quantum noise. This means if the value of a bin is N before normalization, the standard deviation is $\sqrt{N}$. Consequently, it is questionable to extrapolate normalized values higher than $10^{-3}$ to below $10^{-15}$.

Further modifications and variations of the present invention will be apparent to those skilled in the art in view of this description. Accordingly, this description is to be construed as illustrative only and is for the purpose of teaching those skilled in the art the general manner of carrying out the present invention. It is to be understood that the forms of the invention shown and described herein are to be taken as the presently preferred embodiments.

REFERENCE LIST 1 transmitter
2 FEC encoder
3 modulator
4 optical channel
10 receiver
11 physical interface
12 AGC or VGA
13 ADC
14 clock recovery (CR)
15 sampling phase adjustment (SPA) circuit 15,
17 MLSD
18 FEC decoder
19 channel model unit
20 receiver control node
21 reliability threshold
22 counters
23 logarithmizer
24 channel model circuitry
25 pdf
30 extrapolation method
31-38 steps

The invention claimed is:

1. A method comprising:
repeatedly comparing an input signal with a first number of thresholds to obtain a value at each comparison, each value belonging to a value range comprising a second number of different possible values, said second number being equal to said first number plus one;
counting the number ($f_b$) of equal values during a period of time thereby obtaining said second number of counts;
comparing said counts with a count threshold, the counts exceeding said count threshold being defined as reliable counts, and the counts lower than or equal to said count threshold being defined as unreliable counts;
determining an order for use in an extrapolating function for extrapolating a probability density function in a tail region by: calculating a next unreliable count using a lower and a higher value for a determined order to obtain a next first unreliable count for said lower value of said order and a next second unreliable count for said higher value of said order, wherein an order of said extrapolating function is considered equal to said lower value, if said next first and second unreliable counts differ less than or equal to a count difference.

2. The method of claim 1, wherein said determining further comprises:
repeatedly increasing said lower value and said higher value for said order and calculating new next first and second unreliable counts using said increased lower and higher values, respectively, if the former first and second unreliable counts differ more than said count difference.

3. The method of claim 1, wherein said determining further comprises:
defining an upper limit of said order;
increasing said count difference if said higher value for said order is equal to or higher than said upper limit of said order; and
restarting said determining with the initial lower and higher values for said order.

4. The method of claim 1, wherein a logarithm of the next unreliable count, $\Phi^v(r_k)$, is extrapolated using the extrapolating function:

$$\Phi^v(r_k) = \sum_{i=0}^{v} (-1)^{v-i} \binom{v+1}{i} \Phi^v(r_{k-v-1+i}), v = v_E, v_E+1,$$

$r_k$ being values indexed by k belonging to said value range comprising a second number of different possible values;
v being said order of said extrapolating function;
$\Phi^{v_E}(r_k)$ being the next first unreliable count for said lower value $v_E$ of said order;
$\Phi^{v_E+1}(r_k)$ being the next second unreliable count for said higher value $v_E+1$ of said order; and
$\Phi^v(r_{k-v-1+i})$ being a logarithm of the reliable counts or the previously extrapolated logarithms of counts.

5. The method of claim 4, wherein the logarithm of the reliable counts is quantized, thereby obtaining quantized logarithms, before said extrapolating function is applied to said quantized logarithms.

6. The method of claim 1, wherein a logarithm of the next unreliable count, $\Phi^v(r_{k-v})$, is extrapolated using the extrapolating function:

$$\Phi^v(r_k) = \sum_{i=1}^{v+1} (-1)^{1-i} \binom{v+1}{i} \Phi^v(r_{k+i}), v = v_E, v_E+1,$$

$r_k$ being values indexed by k belonging to said value ran a comprising a second number of different possible values;
v being said order of said extrapolating function;
$\Phi^{v_E+1}(r_k)$ being the next first unreliable count for said lower value $v_E+1$ of said order; and
$\Phi^v(r_{k+i})$ being a logarithm of the reliable counts or the previously extrapolated logarithms of counts.

7. A tail extrapolator comprising:
a plurality of comparators configured to compare an input signal (r(t)) with a first number of thresholds to obtain a value for each comparison, each value belonging to a value range comprising a second number of different possible values, said second number being equal to said first number plus one;
a plurality of counters configured to count the number of equal values during a period of time thereby obtaining said second number of counts;
a comparator configured to compare said counts with a count threshold, the counts exceeding said count threshold being defined as reliable counts, and the counts lower than or equal to said count threshold being defined as unreliable counts; and
a processor configured to calculate an extrapolating function used for extrapolating a probability density function in a tail region and to determine an order for use in said extrapolating function by:
calculating a next unreliable count using a lower and a higher value for a predetermined order to obtain a next first unreliable count for said lower value of said order and a next second unreliable count for said higher value of said order, wherein an order of said extrapolating function is considered equal to said lower value, if said next first and second unreliable counts differ less than or equal to a count difference.

8. The tail extrapolator of claim 7, wherein to determine said order the processor is configured to: repeatedly increase said lower value and said higher value for said order and calculate new next first and second unreliable counts using said increased lower and higher values, respectively, if the former first and second unreliable counts differ more than said count difference.

9. The tail extrapolator of claim 7, wherein to determine said order the processor is configured to:
define an upper limit of said order;
increase said count difference, if said higher value for said order is equal to or higher than said upper limit of said order; and
restart the determination of the order with the initial lower and higher values for said order.

10. The tail extrapolator of claim 7, wherein a logarithm of the next unreliable count, $\Phi^v(r_k)$ is extrapolated using the extrapolating function:

$$\Phi^v(r_k) = \sum_{i=0}^{v} (-1)^{v-i} \binom{v+1}{i} \Phi^v(r_{k-v-1+i}), v = v_E, v_E + 1,$$

$(r_k)$ being values indexed by k belonging to said value range comprising a second number of different possible values;
v being said order of said extrapolating function;
$\Phi^{v_E}(r_k)$ being the next first unreliable count for said lower value $v_E$ of said order; and
$\Phi^{v_E+1}(r_k)$ being the next second unreliable count for said higher value $v_E+1$ of said order; and
$\Phi^v(r_{k-v-1+i})$ being a logarithm of the reliable counts or the previously extrapolated logarithms of counts.

11. The tail extrapolator of claim 7, wherein a logarithm of the next unreliable count, is extrapolated using the extrapolating function:

$$\Phi^v(r_k) = \sum_{i=1}^{v+1} (-1)^{1-i} \binom{v+1}{i} \Phi^v(r_{k+i}), v = v_E, v_E + 1,$$

$(r_k)$ being values indexed by k belonging to said value range comprising a second number of different possible values;
v being said order of said extrapolating function;
$\Phi^v(r_k)$ being the next first unreliable count for said lower value $v_E$ of said order.
$\Phi^{v_E+1}(r_k)$ being the next second unreliable count for said higher value $v_E+1$ of said order; and
$\Phi^v(r_{k+1})$ being a logarithm of the reliable counts or the previously extrapolated logarithms of counts on the right hand side of said next unreliable count.

* * * * *